US006507255B1

(12) United States Patent
Ennis et al.

(10) Patent No.: US 6,507,255 B1
(45) Date of Patent: Jan. 14, 2003

(54) REMOTELY CONTROLLABLE CIRCUIT BREAKER

(75) Inventors: Ralph M. Ennis, Imperial, PA (US); James R. Farley, Pittsburgh, PA (US); John A. Wafer, Moon Township, PA (US); Kevin A. Simms, Houston, PA (US)

(73) Assignee: Eaton Corporation, Cleveland, OH (US)

( * ) Notice: Subject to any disclaimer, the term of this patent is extended or adjusted under 35 U.S.C. 154(b) by 254 days.

(21) Appl. No.: 09/709,252

(22) Filed: Nov. 8, 2000

(51) Int. Cl.[7] .......................... H02H 3/00; H01H 75/00; H01H 73/00

(52) U.S. Cl. ............................... 335/6; 335/13; 335/14; 361/115

(58) Field of Search ........................ 335/6–43; 361/114, 361/115

(56) References Cited

U.S. PATENT DOCUMENTS 4,897,625 A * 1/1990 Yokoyama et al. ........... 335/14
5,301,083 A 4/1994 Grass et al.
5,373,411 A 12/1994 Grass et al.
5,633,776 A 5/1997 Juncu et al.

OTHER PUBLICATIONS

State–of–the–Art Magnetic Latching Solenoid Technology for the Energy–Efficient '90S; Dormeyer Industries, 1999, 1p., No month.

* cited by examiner

*Primary Examiner*—Ramon M. Barrera
(74) *Attorney, Agent, or Firm*—Martin J. Moran

(57) ABSTRACT

A circuit breaker has a set of remotely controllable secondary contacts electrically connected in series with the main contacts which provide overcurrent or fault current protection. An operating mechanism opens and closes the set of main contacts. The secondary contacts are opened and closed by a latching solenoid. The latching solenoid includes a plunger latchable to a first position, which opens the set of secondary contacts, and to a second position which closes the set of secondary contacts. The latching solenoid also includes an open/close coil which when energized with a first polarity signal operates the plunger to the first position and which when energized with an opposite second polarity signal operates the plunger to the second position. A circuit is structured for cooperation with a remote control circuit for energizing the coil with the first polarity signal or, alternatively, the second polarity signal.

29 Claims, 5 Drawing Sheets

FIG.3
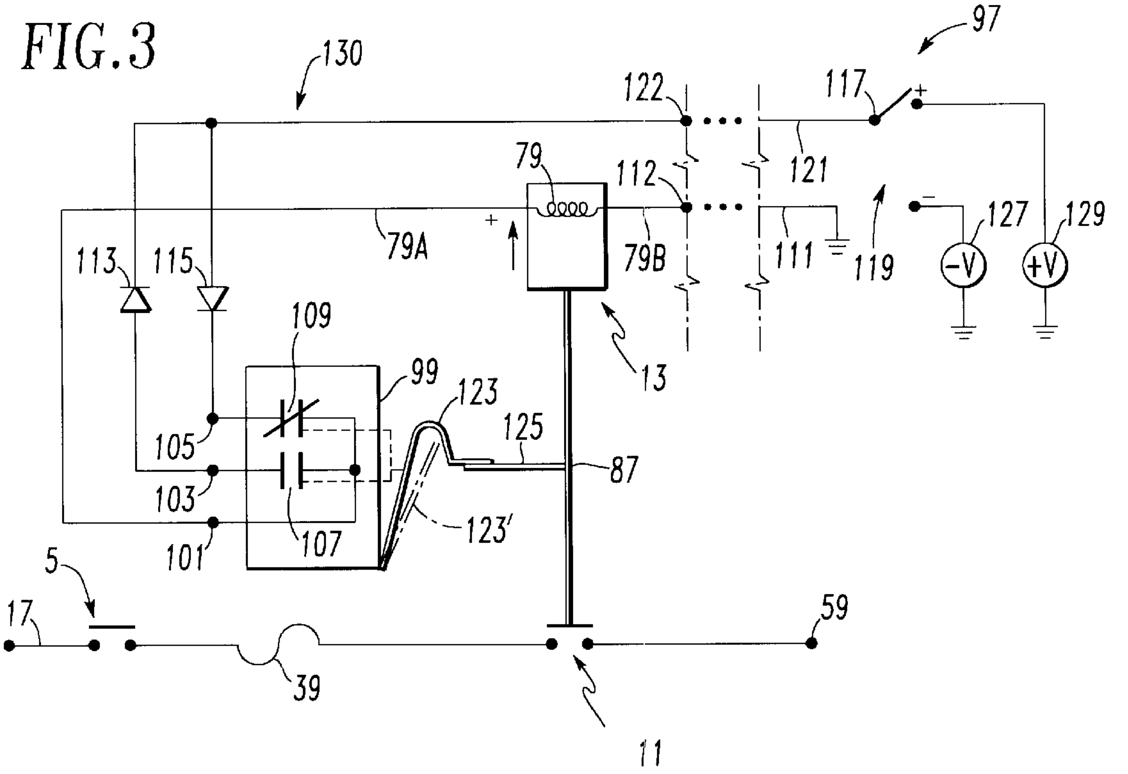
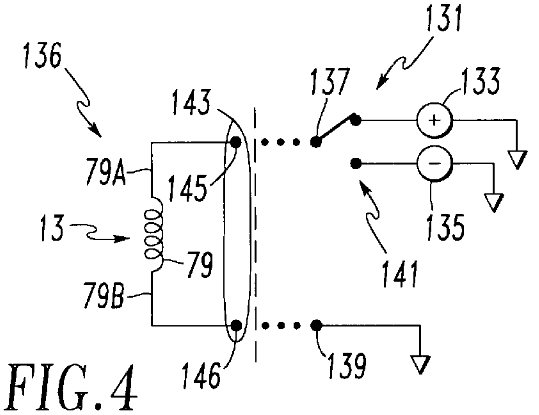
FIG.4
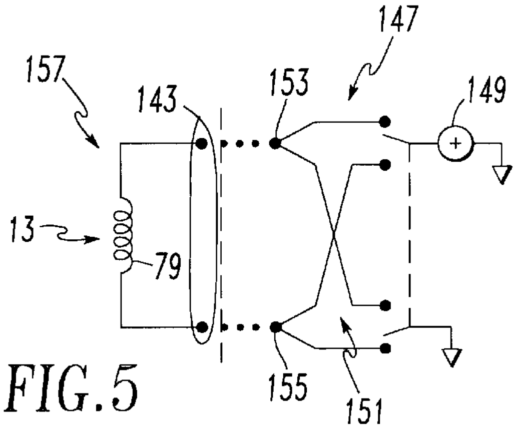
FIG.5
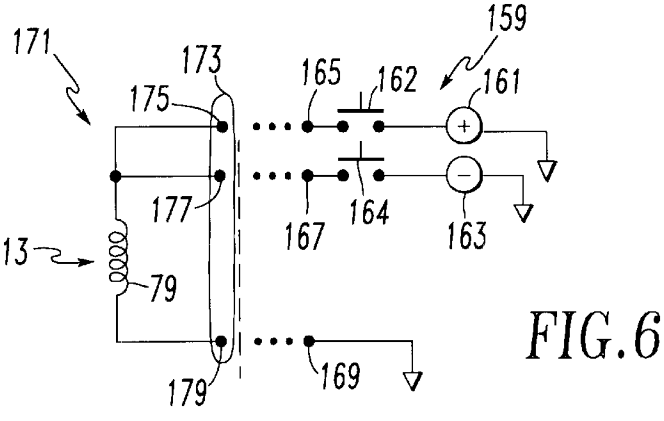
FIG.6

REMOTELY CONTROLLABLE CIRCUIT BREAKER

CROSS-REFERENCE TO RELATED APPLICATIONS

This application is related to commonly owned United States Patent Application Ser. No. 09/514,103, filed Feb. 28, 2000, entitled: "A Remotely Controllable Circuit Breaker With Combined Visual Indication of State and Manual Override"; and commonly owned United States Patent Application Ser. No. 09/514,458, filed Feb. 28, 2000, entitled: "Remotely Controllable Circuit Breaker".

BACKGROUND OF THE INVENTION

1. Field of the Invention

This invention relates to circuit breakers for protecting electric power circuits. More particularly, it relates to circuit breakers with a set of secondary contacts, which are remotely controllable through a latchable operator, such as a magnetically latchable solenoid. The invention also relates to circuit breakers with a set of contacts, which are remotely controllable through a latchable operator.

2. Background Information

Circuit breakers used in residential and light commercial applications are commonly referred to as miniature circuit breakers because of their limited size. Such circuit breakers typically have a pair of separable contacts opened and closed by a spring biased operating mechanism. A thermal-magnetic trip device actuates the operating mechanism to open the separable contacts in response to persistent over-current conditions and to short circuits. Usually, circuit breakers of this type for multiple circuits within a residence or commercial structure are mounted together within a load center which may be located in a basement or other remote location. In some applications, it has been found convenient to use the circuit breakers for other purposes than just protection, for instance, for load shedding. It is desirable to be able to perform this function remotely, and even automatically, such as under the control of a computer. However, the spring biased operating mechanisms are designed for manual reclosure and are not easily adapted for reclosing remotely. In any event, such operating mechanisms are not designed for repeated operation over an extended period of time.

U.S. Pat. Nos. 5,301,083 and 5,373,411 describe a remotely operated circuit breaker, which introduces a second pair of contacts in series with the main separable contacts. The main contacts still interrupt the overcurrent, while the secondary contacts perform the discretionary switching operations. The secondary contacts are controlled by a solenoid, which is spring biased to close the contacts. The solenoid has two coils, an opening coil and a holding coil. Initially, both coils are energized to open the contacts. Power to the opening coil is then turned off, and only the holding coil remains energized. Thus, continuous power is required to keep the main contacts open. When power to the holding relay is terminated, the spring recloses the secondary contacts.

There is room for improvement in remotely operated circuit breakers.

There is a need for a remotely controllable circuit breaker, which is simple and economical.

SUMMARY OF THE INVENTION

These needs and others are satisfied by the invention, which is directed to a remotely controllable circuit breaker, which includes a latching solenoid to open and close remotely controllable contacts. The solenoid has a coil, which when energized with a first polarity signal, operates the solenoid's plunger to a first position that opens the contacts, and which when energized with a second polarity signal operates the plunger to a second position in which the contacts are closed.

In accordance with one aspect of the invention, a remotely controllable circuit breaker includes a set of main contacts; an operating mechanism for opening and closing the set of main contacts; a set of secondary contacts electrically connected in series with the set of main contacts, a latching solenoid including a plunger latchable to a first position which opens the set of secondary contacts and to a second position which closes the set of secondary contacts, a coil which when energized with a first polarity signal operates the plunger to the first position and which when energized with an opposite second polarity signal operates the plunger to the second position; and means structured for cooperation with a remote control circuit for energizing the coil with the first polarity signal or, alternatively, the second polarity signal.

The coil may have a first input and a second input; and the means structured for cooperation with a remote control circuit may include: a first terminal, a second terminal electrically connected to the second input of the coil, a switch having a common terminal electrically connected to the first input of the coil, a first switched terminal selectively electrically connectable to the common terminal and a second switched terminal alternatively selectively electrically connectable to the common terminal, a first diode electrically connected between the first switched terminal and the first terminal, and a second diode having an opposite polarity with respect to the first diode electrically connected between the second switched terminal and the first terminal. The remote control circuit may selectively apply the first polarity signal or, alternatively, the second polarity signal between the first and second terminals.

Preferably, the first and second polarity signals are momentary positive and negative DC voltages, respectively.

The switch may have an operating member coupled to the plunger, first contacts electrically connected between the common terminal and the first switched terminal and second contacts electrically connected between the common terminal and the second switched terminal, the first contacts and second contacts being operated by the operating member, with the first contacts being closed when the plunger is in the first position and the second contacts being closed when the plunger is in the second position.

The switch may be a microswitch, and one of the first and second contacts may be a pair of normally closed contacts and the other may be a pair of normally open contacts.

As another aspect of the invention, a remotely controllable circuit breaker comprises: a set of contacts; a latching solenoid including a plunger latchable to a first position which opens the set of contacts and to a second position which closes the set of contacts, a coil which when energized with a first polarity signal operates the plunger to the first position and which when energized with an opposite second polarity signal operates the plunger to the second position; means for providing a trip signal in response to a trip condition of the set of contacts; means cooperating with the means for providing a trip signal for energizing the coil with the first polarity signal in order to open the set of contacts; and means structured for cooperation with a remote control ircuit for alternatively energizing the coil with the second polarity signal in order to lose the set of contacts.

It is an object of the invention to provide a remotely controllable circuit reaker for which remote control circuitry is simple and economical to implement.

BRIEF DESCRIPTION OF THE DRAWINGS

A full understanding of the invention can be gained from the following description of the preferred embodiments when read in conjunction with the accompanying drawings in which:

FIGS. 3–10 are schematic circuit diagrams of various control circuits for remotely controllable circuit breakers in accordance with the invention.

DESCRIPTION OF THE PREFERRED EMBODIMENTS

Figure 1:
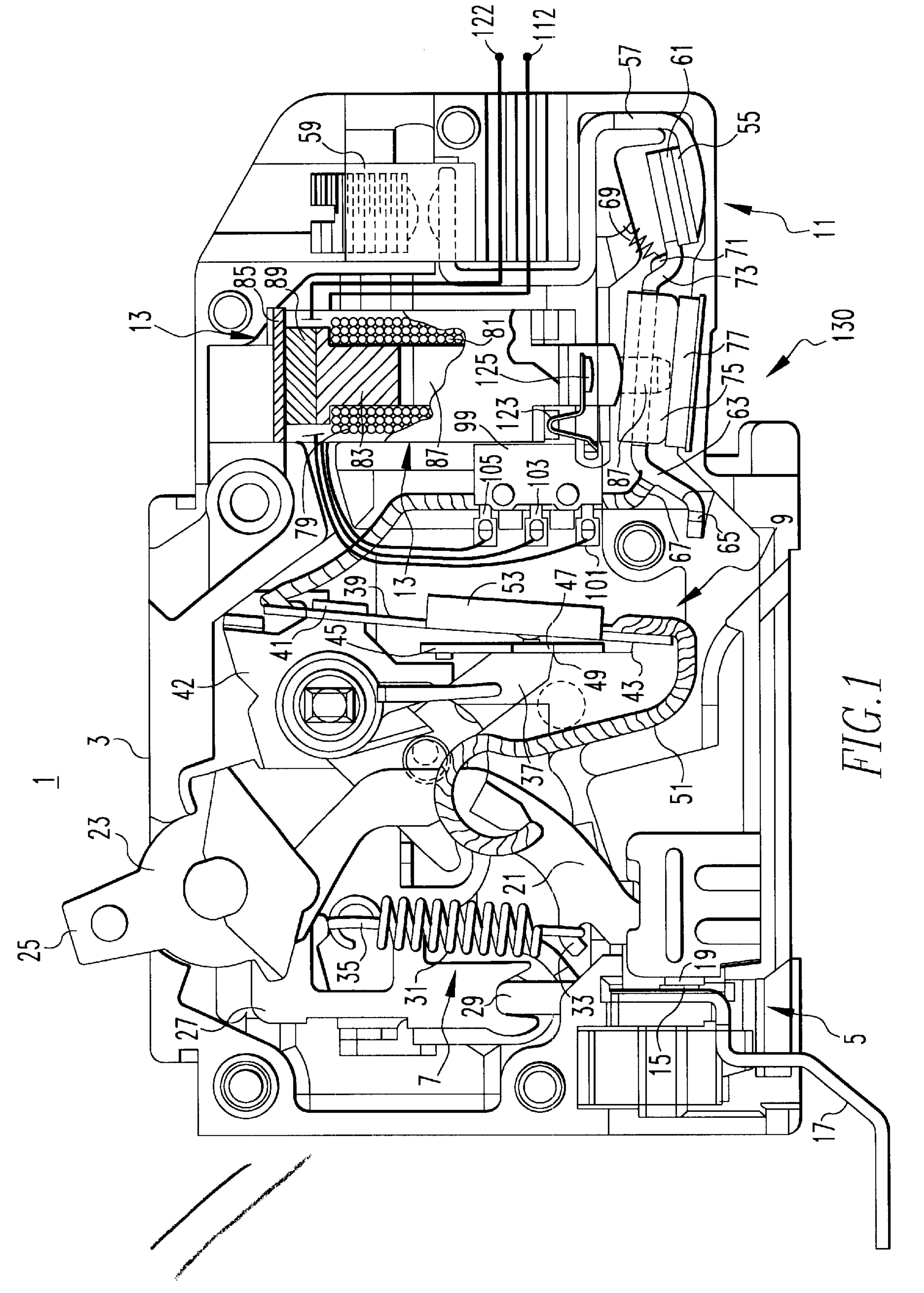
FIG. 1 is an elevational view of a remotely controllable circuit breaker in accordance with the invention shown with the cover removed and with the main contacts and secondary contacts closed.
Figure 2:
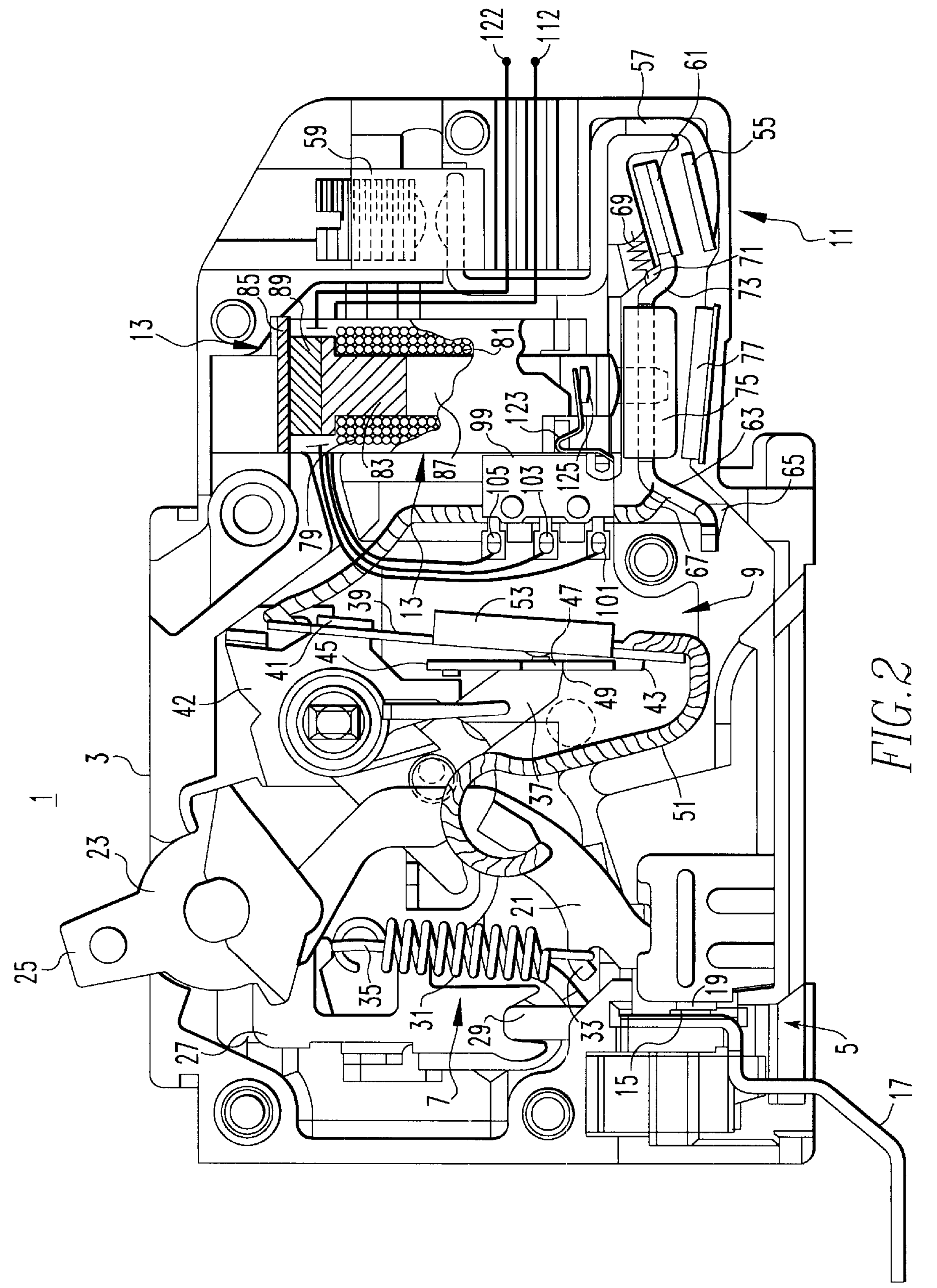
FIG. 2 is a view similar to that of FIG. 1 with the secondary contacts open.

The invention will be described as applied to a miniature circuit breaker, although it will become apparent that it could be applied to other types of circuit breakers as well. Such a miniature circuit breaker 1 includes a molded housing 3 and is shown in FIGS. 1 and 2 with the cover of the housing removed. The basic components of the circuit breaker 1 are a set of main contacts 5, an operating mechanism 7 for opening the set of main contacts 5, and a thermal-magnetic trip device 9 which actuates the operating mechanism 7 to trip the set of main contacts 5 open in response to certain overcurrent or short circuit conditions. Further included are a set of secondary contacts 11 and an actuator in the form of an exemplary magnetically latchable solenoid 13 which is remotely controllable to control the open and closed states of the set of secondary contacts 11.

The set of main contacts 5 includes a fixed contact 15 secured to a line terminal 17 and a moveable main contact 19 which is affixed to an arcuate contact arm 21 which forms part of the operating mechanism 7. The operating mechanism 7 is a well-known device, which includes a pivotally mounted operator 23 with an integrally molded handle 25. The operating mechanism 7 also includes a cradle 27 pivotally mounted on a support 29 molded in the housing. With the handle 25 in the closed position, as shown in FIGS. 1 and 2, a spring 31 connected to a hook 33 on the contact arm 21 and a tab 35 on the cradle 27 holds the main contacts 5 closed. The spring 31 also applies a force with the set of main contacts 5 closed, as shown, to the cradle 27 which tends to rotate the cradle in a clockwise direction about the support 29. However, the cradle 27 has a finger 37, which is engaged by the thermal-magnetic trip device 9 to prevent this clockwise rotation of the cradle under normal operating conditions.

The thermal-magnetic trip device 9 includes an elongated bimetal 39 which is fixed at its upper end to a tab 41 on the metal frame 42 seated in the molded housing 3. Attached to the lower, free end of the bimetal 39 by a lead spring 43 is an armature 45. The armature 45 has an opening 47, which is engaged by a latching surface 49 on the finger 37.

The free end of the bimetal 39 is connected to the contact arm 21 by a flexible braided conductor 51 in order that the load current of the circuit protected by the circuit breaker 1 passes through the bimetal. A persistent overcurrent heats the bimetal 39, which causes the lower end thereof to move to the right, with respect to FIGS. 1 and 2. If this overcurrent is of sufficient magnitude and duration, the latching surface 49 on the finger 37 is pulled out of engagement with the armature 45. This allows the cradle 27 to be rotated clockwise by the spring 31. The clockwise rotation of the cradle 27 moves the upper pivot point for the contact arm 21 across the line of force of the spring 31 in order that the contact arm is rotated counterclockwise, to open the set of main contacts 5, as is well understood. This also results in the handle 25 rotating to an intermediate position (not shown) to indicate the tripped condition of the set of main contacts 5.

In addition to the armature 45, a magnetic pole piece 53 is supported by the bimetal 39. Very high overcurrents, such as those associated with a short circuit, produce a magnetic field which draws the armature 45 to the pull piece 53, thereby also releasing the cradle 27 and tripping the set of main contacts 5 open. Following either trip, the main set of contacts 5 are reclosed by moving the handle 25 fully clockwise, which rotates the cradle 27 counterclockwise until the finger 37 relatches in the opening 47 in the armature 45. Upon release of the handle 25, it moves counterclockwise slightly from the full clockwise position and remains there. With the cradle relatched, the line of force of the spring 31 is reestablished to rotate the contact arm 21 clockwise to close the set of main contacts 5 when the handle 25 is rotated fully counterclockwise to the position shown in FIGS. 1 and 2.

The set of secondary contacts 11 includes a fixed secondary contact 55 which is secured on a load conductor 57 that leads to a load terminal 59. The set of secondary contacts 11 also includes a moveable secondary contact 61 which is fixed to a secondary contact arm 63 that at its opposite end is seated in a molded pocket 65 in the molded housing 3. The secondary contact arm 63 is electrically connected in series with the set of main contacts 5 by a second flexible braided conductor 67 connected to the fixed end of the bimetal 39. Thus, a circuit or load current is established from the line terminal 17 through the set of main contacts 5, the contact arm 21, the flexible braided conductor 51, the bimetal 39, the second flexible braided conductor 67, the secondary contact arm 63, the set of secondary contacts 11, and the load conductor 57 to the load terminal 59.

The set of secondary contacts 11 is biased to the closed state shown in FIG. 1 by a helical compression spring 69 seated on a projection 71 on an offset 73 in the secondary contact arm 63. As discussed in U.S. Pat. No. 5,301,083, the spring 69 is oriented such that the force that it applies to the secondary contact arm 63 tending to close the set of secondary contacts is relaxed to a degree with the set of secondary contacts 11 in the open position of FIG. 2. This serves the dual purpose of providing the force needed to close the set of secondary contacts 11 against rated current in the protected circuit and also reducing the force that must be generated by the magnetically latching solenoid 13 to hold the set of secondary contacts in the open state. In order for the set of secondary contacts 11 to withstand short circuit currents and allow the set of main contacts 5 to perform the interruption, the magnet force generated by the short circuit current causes an armature 75 mounted on the secondary contact arm 63 to be attracted to a pole piece 77 seated in the molded housing 3 thereby clamping the secondary contacts closed.

As shown by the partial sections in FIGS. 1 and 2, the actuator/solenoid 13 includes an open/close coil 79 wound on a steel core 83 supported by a steel frame 85. A plunger 87 moves rectilinearly within the single coil 79. A permanent magnet 89 is seated between the steel core 83 and the steel frame 85. To operate the coil 79, when the plunger 87 is not seated against the core 83 and a magnetic field is induced by applying a suitable voltage to the windings of the coil 79, the core 83 and the plunger 87 then attract magnetically, pulling the plunger 87 against the core 83. The magnet 89 then holds the plunger 87 against the core 83 without an induced electrical field. To release the plunger 87 from the core 83, an opposite flux field is induced in the coil windings by applying an opposite polarity voltage thereto. When the opposite field is applied, the magnetic field from the permanent magnet 89 is zeroed out or decreased to the point where a light axial load is capable of pulling the plunger 87 away from the core 83.

The plunger 87 engages the secondary contact arm 63. When the open/close coil 79 is energized with a close polarity signal (e.g., a negative voltage in the exemplary embodiment), a magnetic field is produced which drives the plunger 87 downward to a first position which rotates the secondary contact arm 63 clockwise and thereby moves the set of secondary contacts 11 to the closed state. The secondary contacts 11 are maintained in the closed state by the spring 69 as shown in FIG. 1.

When it is desired to open the set of secondary contacts 11, the open/close coil 79 is energized with an open polarity signal (e.g., a positive voltage in the exemplary embodiment), which lifts the plunger 87 and with it the secondary contact arm 63 to a second position which opens the set of secondary contacts 11. With the plunger 87 in the full upward position as shown in FIG. 2, it contacts the steel core 83 and is retained in this second position by the permanent magnet 89. Subsequently, when the open/close coil 79 is again energized with the close polarity signal, the magnetic field generated is stronger than the field generated by the permanent magnet 89 and, therefore, overrides the latter and moves the plunger 87 back to the first, or closed position.

The open/close coil 79 of the magnetically latching solenoid 13 is remotely controlled by an exemplary circuit 97 of FIG. 3. This remote control circuit 97 interfaces a local switch or internal power cutoff device in the form of microswitch 99, which has a common terminal 101 and first and second switched terminals 103,105. The microswitch 99 includes first contacts 107 electrically connected between the common terminal 101 and the first switched terminal 103, and second contacts 109 30 electrically connected between the common terminal 101 and the second switched terminal 105. The first contacts 107 of the exemplary microswitch 99 are normally open contacts and the second contacts 109 are normally closed contacts. Thus, the first switched terminal 103 is selectively electrically connectable to the common terminal 101, and the second switched terminal 105 is alternatively selectively electrically connectable to the common terminal 101.

The common terminal 101 of the microswitch 99 is electrically connected to one side of the coil 79 and the other side thereof is electrically connected to ground through an external lead 111, which is connected to a terminal 112. The first switched terminal 103 of the microswitch 99 is electrically connected to the anode of diode 113, and the second switched terminal 105 of the microswitch 99 is electrically connected to the cathode of diode 115. The cathode of diode 113 and the anode of diode 115 are electrically connected together and to a common external terminal 117 of a two-position switch 119 by an external lead 121, which is connected to a terminal 122.

The microswitch 99 has an operating member in the form of actuating lever 123, which is engaged by a projection 125 on the solenoid plunger 87. When the solenoid 13 is latched in the upward or second position as shown in FIG. 2 in order that the second set of contacts 11 are open, the microswitch 99 is actuated and the first or normally open contacts 107 are closed while the second or normally closed contacts 109 are open. In this state, when the switch 119 is moved to its lower position, the negative voltage from DC voltage source 127 is directed through terminal 117, lead 121, terminal 122, and reverse diode 113 to the coil 79. In turn, the negative voltage energizes the coil 79 to effect downward movement of the plunger 87. Thus, the remote control circuit 97 selectively applies a first polarity (e.g., positive) signal or, alternatively, a second (e.g., negative) polarity signal between the leads 121,111.

Continuing to refer to FIG. 3, with energization of the coil 79, the plunger 87 is driven downward to its first position which closes the set of secondary contacts 11 and allows the actuating lever 123 of the microswitch 99 to move to the open position (as shown in phantom in FIG. 3). This results in opening of the normally open contacts 107 and closure of the normally closed contacts 109 to disconnect the voltage source 127 from the contacts 107. However, the set of second contacts 11 remains latched in the closed position due to the spring 69 of FIG. 2. With the normally closed contacts 109 now closed, the coil 79 is enabled by application of the positive voltage from the DC voltage source 129. However, no current flows through the coil 79 until the remote switch 119 is positioned upward and the positive voltage from DC voltage source 129 is directed through terminal 117, lead 121, terminal 122, and forward diode 115 to the coil 79. In turn, the positive voltage energizes the coil 79 to effect upward movement of the plunger 87.

Further flexibility is available when it is considered that the coupling between the plunger 87 and the microswitch 99 may be arranged so that the actuating lever 123 of the switch is operated when the plunger 87 is in the first downward position and the set of secondary contacts 11 is closed. Also, with the diodes 113,115, AC voltage sources as well as the exemplary DC voltage sources 127,129, respectively, may be employed.

As the set of secondary contacts 11 are latched in either the open state or the closed state, it is not necessary to provide continuous power from the voltage sources 127 or 129 to maintain them in either state. Accordingly, momentary signals (as discussed below in connection with FIGS. 4–6, 8 and 10) can be employed to control operation of the solenoid 13. Since the solenoid 13 and contacts 11 of FIG. 3 latch in the open and closed positions, in the exemplary embodiment, only momentary power is needed to open and close the set of secondary contacts 11. Alternatively, continuous power or modified control circuits as shown in FIGS. 4–10 may be employed. For example, one or two AC sources, one or two DC sources, or pulsed AC or DC sources may be employed to provide power.

The remote switches 119 may be one or two manual switches or automatic switches, such as output contacts of a computer system.

In FIG. 3, the first lead 121 is dedicated to a positive or negative DC voltage from the DC voltage sources 127,129 for respective open or close operation. The second lead 111 is dedicated to the ground for the DC voltage sources. In this embodiment, the microswitch 99 is employed as a coil power cutoff switch in order to minimize power consumption during typical times when the circuit breaker 1 is not being switched from the open to close or from the close to open positions. An interface circuit 130 includes the microswitch 99, the diodes 113,115 and the terminals 112, 122.

The circuit 130 is structured for cooperation with the remote control circuit 97.

FIG. 4 shows another remote control circuit 131 having a positive DC voltage source 133 and a negative DC voltage source 135 for two-wire or two-terminal control of a circuit breaker 136 having the latching solenoid 13. A first terminal 137 of the circuit 131 is dedicated to a positive or negative DC voltage for respective open or close operation. A second terminal 139 of the circuit 131 is dedicated to the ground for the DC voltage sources 133,135. Preferably, a two-position switch 141 having an intermediate position (not shown) in which both the positive and negative DC power sources 133,135 are disconnected from the first terminal 137 is employed in order to minimize power consumption during typical times when the circuit breaker 136 is not being switched from the open to close or from the close to open positions.

The circuit breaker 136 has an interface circuit 143 structured for cooperation with the remote control circuit 131. The circuit 143 includes a first terminal 145 electrically connected to the first coil input 79A, and a second terminal 146 electrically connected to the second coil input 79B. The remote control circuit 131 selectively applies the exemplary positive DC voltage signal or, alternatively, the exemplary negative DC voltage signal between the first terminals 137,145 and the second terminals 139,146.

Figure 10:
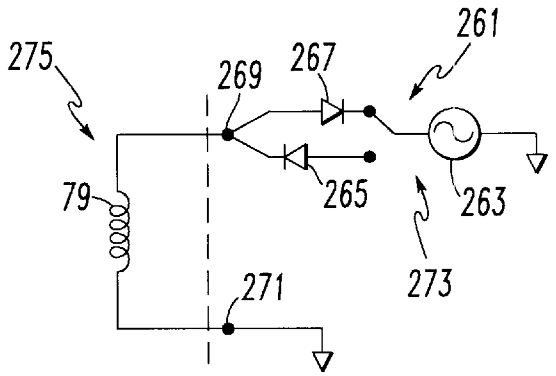

Although exemplary positive and negative DC voltages are shown in FIG. 4, other suitable signals include, for example: (1) momentary positive and negative DC voltages; (2) positive and negative halfwave rectified AC voltages (as shown in FIG. 10); and (3) momentary positive and negative halfwave rectified AC voltages.

FIG. 5 shows another remote control circuit 147 having a single DC voltage source 149 for two-wire/two-terminal control. A double pole, double throw (DPDT) switch 151 is employed to switch a single (e.g., positive or negative) DC voltage in order to provide a positive or negative voltage as referenced between the first and second terminals 153,155 for respective open or close operation. Preferably, a DPDT switch having an intermediate position in which the DC power source is disconnected from the two terminals 153, 155 is employed in order to minimize power consumption during typical times when the circuit breaker 157 is not being switched from the open to close or from the close to open positions. In this regard, the circuit breaker 157 is similar to the circuit breaker 136 of FIG. 4, except that different respective remote control circuits 147 and 131 are employed.

FIG. 6 shows another remote control circuit 159 having positive and negative DC voltage sources 161,163 for three-terminal control. The first terminal 165 of the circuit 159 is dedicated to the positive DC voltage for open operation, the second erminal 167 is dedicated to a negative DC voltage for close operation, and the third erminal 169 is dedicated to the ground for the DC voltage sources 161,163. In this embodiment, momentary open and close switches 162,164 are preferably employed by the remote control circuit 159 in order to minimize power consumption during typical times when the circuit breaker 171 is not being switched from the open to close or from the close to open positions. Preferably, suitable protection is provided (not shown) to preclude the direct connection of the positive and negative DC voltage sources 161,163.

The circuit breaker 171 includes the coil 79 and an interface circuit 173, which is structured for cooperation with the remote control circuit 159. The circuit 173 includes a first terminal 175 electrically connected to the first input of the coil 79, a second terminal 177 electrically connected to the first coil input, and a third terminal 179 electrically connected to the second coil input. The remote control circuit 159 selectively applies the first polarity signal between the first terminals 165,175 and the third terminals 169,179 or, alternatively, the second polarity signal between the second terminals 167,177 and the third terminals 169, 179.

Figure 7:
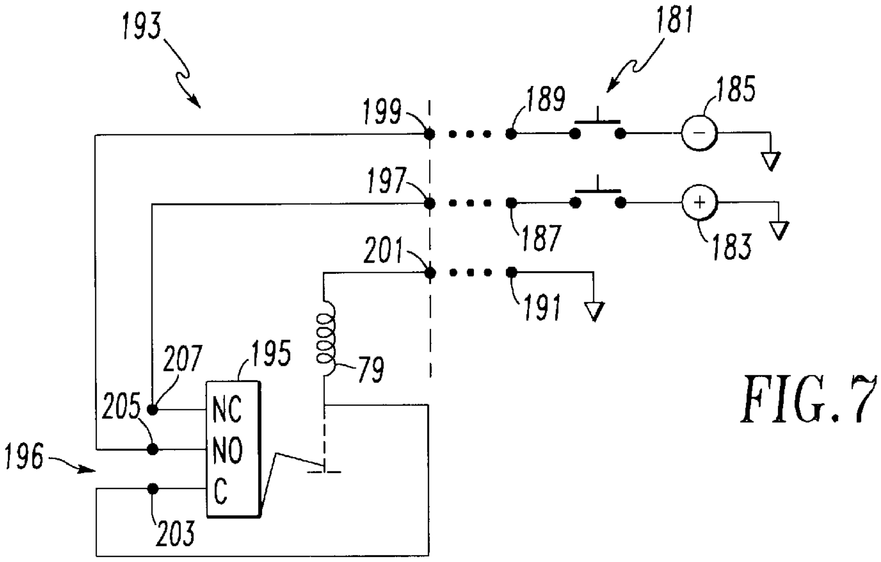

FIG. 7 shows another remote control circuit 181 having positive and negative DC voltage sources 183,185 for three-terminal control. The first terminal 187 is dedicated to a positive DC voltage for open operation, the second terminal 189 is dedicated to a negative DC voltage for close operation, and the third terminal 191 is dedicated to the ground for the DC voltage sources 183,185. In this embodiment, the circuit breaker 193 includes a microswitch 195, which operates in the same manner as the microswitch 99 of FIG. 3.

The circuit breaker 193 has an interface circuit 196, which includes the microswitch 195 and the terminals 197,199, 201, structured for cooperation with the remote control circuit 181. The circuit 196 includes a first terminal 197, a second terminal 199, and a third terminal 201 electrically connected to the second input of the coil 79. The common terminal 203 of the microswitch 195 is electrically connected to the first coil input, the first (normally open) (NO) switched terminal 205 is electrically connected to the second terminal 199 and selectively electrically connectable to the common terminal 203, and the second (normally closed) (NC) switched terminal 207 is electrically connected to the first terminal 197 and alternatively selectively electrically connectable to the common terminal 203. The remote control circuit 181 selectively applies the first polarity signal between the first terminals 187,197 and the third terminals 191,201 or, alternatively, the second polarity signal between the second terminals 189,199 and the third terminals 191, 201.

Unlike the circuit breaker 130 of FIG. 3, the circuit breaker 193 does not employ the diodes 113,115, since the positive DC voltage on the first terminal 197 is switched to the normally closed contacts, and the negative DC voltage on the second terminal 199 is switched to the normally open contacts. Like the microswitch 99 of FIG. 3, the microswitch 195 similarly operates to minimize power consumption during typical times when the circuit breaker 193 is not being switched from the open to close or from the close to open positions.

Figure 8:
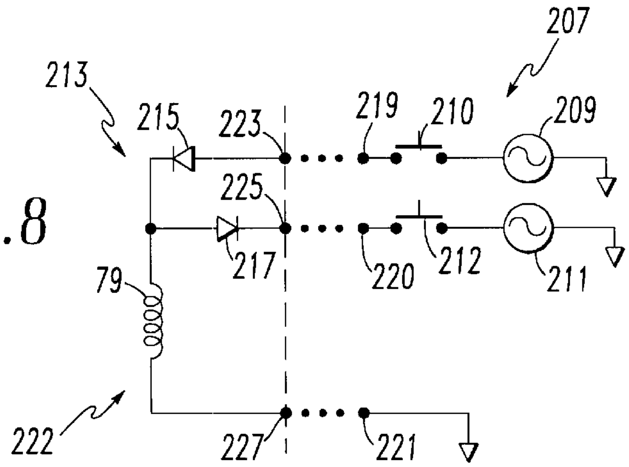

FIG. 8 shows another remote control circuit 207 having two AC voltage sources 209,211 for three-terminal control. This circuit 207 is similar to the remote control circuit 181 of FIG. 6, except that AC voltage sources rather than DC voltage sources are employed. Preferably, momentary open and close switches 210,212 are employed by the remote control circuit 207 in order to minimize power consumption during typical times when the circuit breaker 213 is not being switched from the open to close or from the close to open positions.

The circuit breaker 213 employs forward and reverse diodes 215,217 in order to direct positive or negative halfwave rectified voltages to the coil 79. A first terminal 219 is dedicated to the first AC voltage source 209 and the forward diode 215 for open operation, a second terminal 220 is dedicated to the second AC voltage source 211 and the reverse diode 217 for close operation, and a third terminal 221 is dedicated to the ground for the AC voltage sources 209,211. Preferably, suitable protection is provided (not shown) to preclude the simultaneous closure of both open and close momentary switches 210,212. Alternatively, a single AC voltage source (not shown) may be employed.

The circuit breaker 213 has an interface circuit 222, which includes the diodes 215,217 and terminals 223,225,227, structured for cooperation with the remote control circuit 207. The first terminal 223 is electrically connected to the anode of the diode 215, the second terminal 225 is electrically connected to the cathode of the diode 217, and the third terminal 227 is electrically connected to the second input of the coil 79. The first coil input is electrically connected to the anode of the diode 217 and to the cathode of the diode 215. The remote control circuit 207 selectively applies a first polarity signal or the AC voltage of the AC source 209 between the first terminals 219,223 and the third terminals 221,227 or, alternatively, a second polarity signal or the AC voltage of the AC source 211 between the second terminals 220,225 and the third terminals 221,227. Hence, the circuit breaker 213 may be operated by a wide range of voltage sources (e.g., positive and negative DC, momentary positive and negative DC, one AC, two AC, momentary AC, two momentary AC).

Figure 9:
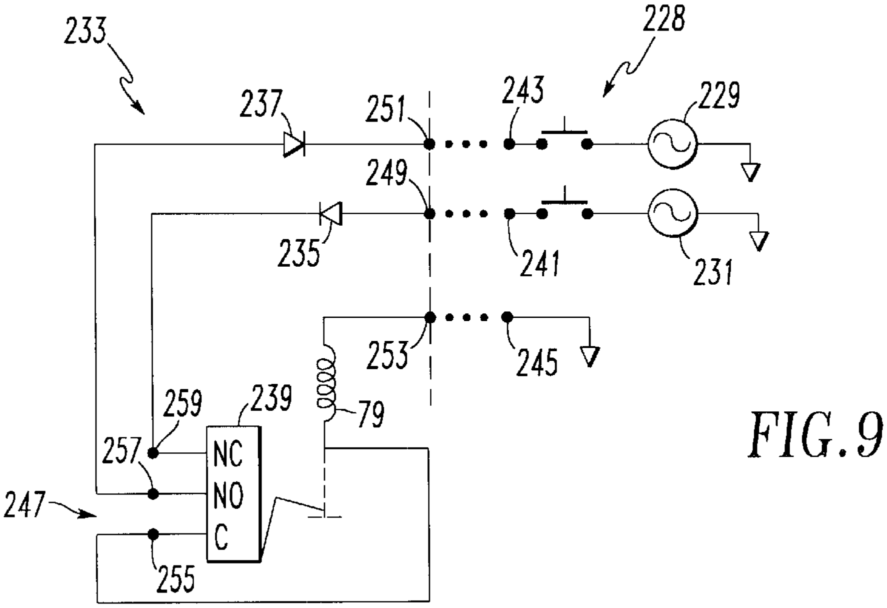

FIG. 9 shows another remote control circuit 228 having two AC voltage sources 229,231 for three-terminal control of a circuit breaker 233 having diodes 235,237 and microswitch 239. A first terminal 241 of the circuit 228 is dedicated to a first AC voltage and the forward diode 235 for open operation, a second terminal 243 is dedicated to a second AC voltage and the reverse diode 237 for close operation, and a third terminal 245 is dedicated to the ground for the AC voltage sources 229,231. In this embodiment, the microswitch 239 operates in the same manner as the microswitch 99 of FIG. 3. The circuit 228 is similar to the remote control circuit 181 of FIG. 7, except that one or two AC voltage sources 229,231 rather than two DC voltage sources 183,185 are employed. Also, the circuit breaker 233 employs the forward and reverse diodes 235,237 in order to direct positive or negative half-wave rectified voltages through the microswitch 239 to the coil 79.

The circuit breaker 233 has an interface circuit 247, which includes the microswitch 239 and the terminals 249,251, 253, structured for cooperation with the remote control circuit 228. The first terminal 249 is electrically connected to the anode of the diode 235, the second terminal 251 is electrically connected to the cathode of the diode 237, and the third terminal 253 is electrically connected to the second input of the coil 79. The common terminal 255 of the microswitch 239 is electrically connected to the first input of the coil 79, the first switched (normally open) (NO) terminal 257 is electrically connected to the anode of the second diode 237 and selectively electrically connectable to the common terminal 255. The second switched (normally closed) (NC) terminal 259 is electrically connected to the cathode of the first diode 235 and alternatively selectively electrically connectable to the common terminal 255. Like the microswitch 99 of FIG. 3, the microswitch 239 similarly operates to minimize power consumption during typical times when the circuit breaker 233 is not being switched from the open to close or from the close to open positions.

The remote control circuit 228 selectively applies a positive signal or an AC signal between the first terminals 241,249 and the third terminals 245,253 or, alternatively, applies a negative signal or an AC signal between the second terminals 243,251 and the third terminals 245,253, in order that the first diode 235 applies the first polarity signal to the second switched terminal 259 or, alternatively, the second diode 237 applies the second polarity signal to first switched terminal 257.

FIG. 10 shows another remote control circuit 261 having one AC voltage source 263 for two-terminal control. This circuit 261 is similar to the remote control circuit 131 of FIG. 4, except that one AC voltage source 263 rather than two DC voltage sources 133,135 are employed, and except that forward and reverse diodes 265,267 are employed by the circuit 261 in order to direct either positive or negative half-wave rectified voltages to the coil 79. A first terminal 269 is dedicated to the cathode of the first diode 265 and the anode of the second diode 267, which provide the respective positive and negative half-wave rectified voltages to the coil 79. Preferably, a two position switch 273 having an intermediate position (not shown) in which the AC power source 263 is disconnected from the anode of the first diode 265 and the cathode of the second diode 267 is employed in order to minimize power consumption during typical times when the circuit breaker 275 is not being switched from the open to close or from the close to open positions. Otherwise, the first position of the switch 273 connects the AC power source 263 to the anode of the first diode 265 for open operation, and the second position of the switch 273 connects the AC power source 263 to the cathode of the second diode 267 for close operation. The circuit breaker 275 is similar to the respective circuit breakers 136 and 157 of FIGS. 4 and 5, except that different respective remote control circuits 261, 131, and 147 are employed.

Figure 11:
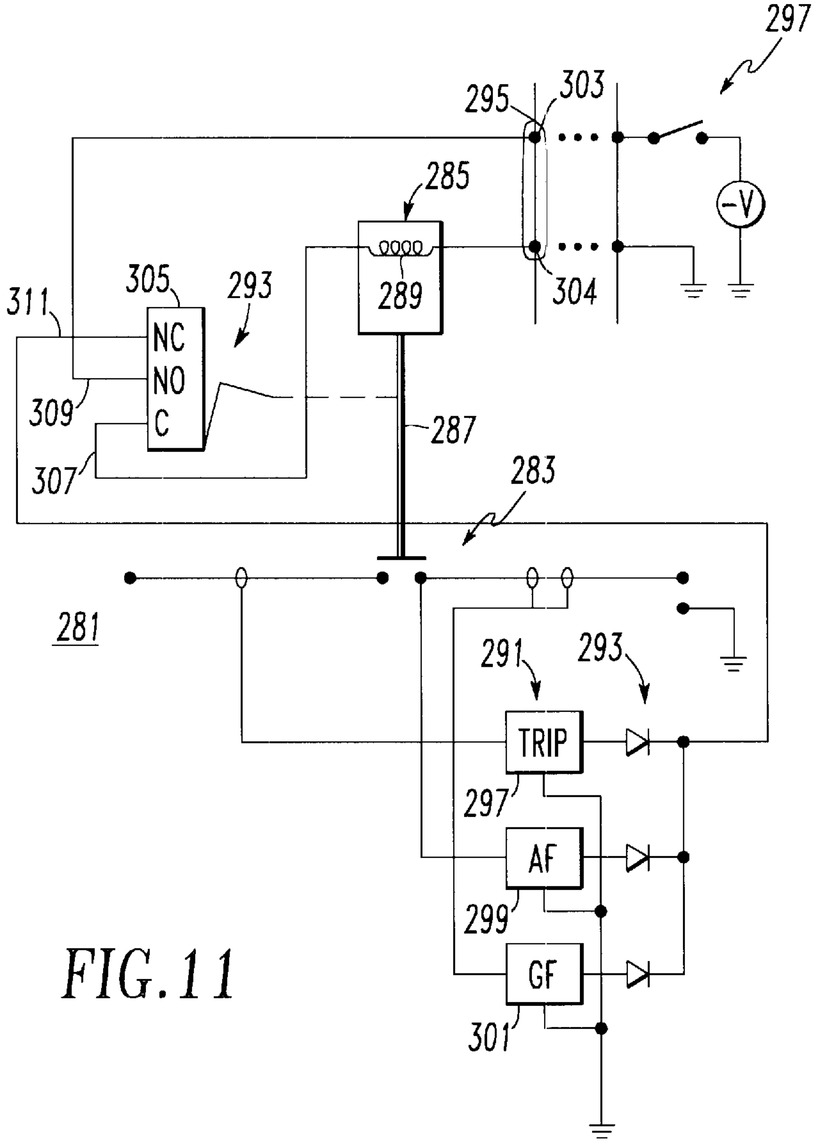
FIG. 11 is a block diagram of a circuit breaker including a set of contacts controlled by a latchable solenoid, which opens in response to an overcurrent or short circuit trip circuit, an arc fault trip circuit, a ground fault trip circuit and/or a remote open signal, and which recloses in response to a remote reset signal in accordance with another embodiment of the invention.

FIG. 11 shows a remotely controllable circuit breaker 281. The circuit breaker 281 includes a set of contacts 283 and a latching solenoid 285. The latching solenoid 285 has a plunger 287 latchable to a first position which opens the set of contacts 283 and to a second position which closes the set of contacts 283, and a coil 289 which when energized with a first polarity signal (e.g., a positive voltage) operates the plunger 287 to the first (open) position and which when energized with an opposite second polarity signal (e.g., a negative voltage) operates the plunger 287 to the second (closed) position. The circuit breaker 281 also includes a circuit 291, which provides a trip signal in response to a trip condition of the set of contacts 283, and a circuit 293, which cooperates with the circuit 291 to energize the coil 289 with the first polarity signal in order to open the set of contacts 283. The circuit breaker 283 further includes a circuit 295, which is structured for cooperation with a remote control circuit 297 that alternatively energizes the coil 289 with the second polarity signal in order to close the set of contacts 283.

In the exemplary embodiment, the circuit 291 includes three separate trip circuits including the electronic trip circuit 297 which provides the trip signal in response to overcurrent or fault current conditions, the arc fault (AF) trip circuit 299 which provides the trip signal in response to arc fault conditions, and ground fault (GF) circuit 301 which provides the trip signal in response to ground fault conditions. Although three trip circuits 297,299,301 are shown, the invention is applicable to a wide variety of trip circuits and combinations thereof.

The circuit 295 includes a first terminal 303, and a second terminal 304 electrically connected to the second input of the coil 289. The circuit 293 includes a local switch or internal power cutoff device in the form of microswitch 305, which is similar to the microswitch 99 of FIG. 3, and has a common terminal 307 and first and second switched terminals 309,311. The common terminal 307 is electrically connected to the first coil input, the first switched terminal 309 is electrically connected to the first terminal 303 and alternatively selectively electrically connectable to the common terminal 307, and the second switched terminal 311 is electrically connected to the circuit 293 for providing the first polarity signal and is selectively electrically connectable to the common terminal 307. The circuits 291,293 provide the first polarity signal to the second switched terminal 311 and to the first coil input in order to open the set of contacts 283. The circuit 295 is structured to provide the second polarity signal between the first terminal 303 and the second terminal 304 in order to close the set of contacts 283.

The exemplary remotely controllable circuit breakers disclosed herein include remotely controlled contacts, which are opened and closed by remotely generated signals. Some of the embodiments disclosed herein, which employ a direct interface between a latching solenoid and two or three terminals, employ momentary first and second polarity signals for controlling a latching solenoid in order that continuous power is not required to maintain the contacts in one state or the other. Still other embodiments, which employ an internally switched interface between a latching solenoid and two or three terminals, may employ continuous or momentary first and second polarity signals for controlling the latching solenoid in order that continuous power is not needed to maintain the contacts in one state or the other.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A remotely controllable circuit breaker comprising:

a set of main contacts;

an operating mechanism for opening and closing said set of main contacts;

a set of secondary contacts electrically connected in series with said set of main contacts;

a latching solenoid including a plunger latchable to a first position which opens said set of secondary contacts and to a second position which closes said set of secondary contacts, a coil which when energized with a first polarity signal operates said plunger to said first position and which when energized with an opposite second polarity signal operates said plunger to said second position; and means structured for cooperation with a remote control circuit for energizing said coil with the first polarity signal or, alternatively, the second polarity signal.

2. The remotely controllable circuit breaker of claim 1, wherein said coil has a first input and a second input;

wherein said means structured for cooperation with a remote control circuit includes:

a first terminal, a second terminal electrically connected to the second input of said coil, a switch having a common terminal electrically connected to the first input of said coil, a first switched terminal selectively electrically connectable to said common terminal and a second switched terminal alternatively selectively electrically connectable to said common terminal, a first diode electrically connected between said first switched terminal and said first terminal, and a second diode having an opposite polarity with respect to said first diode electrically connected between said second switched terminal and said first terminal; and wherein said remote control circuit selectively applies the first polarity signal or, alternatively, the second polarity signal between said first and second terminals.

3. The remotely controllable circuit breaker of claim 2, wherein said first polarity signal is a positive DC voltage and said second polarity signal is a negative DC voltage.

4. The remotely controllable circuit breaker of claim 2, wherein said switch has an operating member coupled to said plunger, first contacts electrically connected between said common terminal and said first switched terminal and second contacts electrically connected between said common terminal and said second switched terminal, said first contacts and second contacts being operated by said operating member with said first contacts being closed when said plunger is in said first position and said second contacts being closed when said plunger is in said second position.

5. The remotely controllable circuit breaker of claim 4, wherein said switch is a microswitch and one of said first and second contacts is a pair of normally closed contacts and the other is a pair of normally open contacts.

6. The remotely controllable circuit breaker of claim 1, wherein said coil has a first input and a second input;

wherein said means structured for cooperation with a remote control circuit includes:

a first terminal electrically connected to the first input of said coil, and a second terminal electrically connected to the second input of said coil; and wherein said remote control circuit selectively applies the first polarity signal or, alternatively, the second polarity signal between said first and second terminals.

7. The remotely controllable circuit breaker of claim 6, wherein said first polarity signal is a positive DC voltage and said second polarity signal is a negative DC voltage.

8. The remotely controllable circuit breaker of claim 6, wherein said first polarity signal is a momentary positive DC voltage and said second polarity signal is a momentary negative DC voltage.

9. The remotely controllable circuit breaker of claim 6, wherein said first polarity signal is a positive halfwave rectified AC voltage and said second polarity signal is a negative halfwave rectified AC voltage.

10. The remotely controllable circuit breaker of claim 6, wherein said first polarity signal is a momentary positive halfwave rectified AC voltage and said second polarity signal is a momentary negative halfwave rectified AC voltage.

11. The remotely controllable circuit breaker of claim 1, wherein said coil has a first input and a second input;

wherein said means structured for cooperation with a remote control circuit includes:

a first terminal electrically connected to the first input of said coil, a second terminal electrically connected to the first input of said coil, a third terminal electrically connected to the second input of said coil; and wherein said remote control circuit selectively applies the first polarity signal between said first and third terminals or, alternatively, the second polarity signal between said second and third terminals.

12. The remotely controllable circuit breaker of claim 11, wherein said first polarity signal is a positive DC voltage and said second polarity signal is a negative DC voltage.

13. The remotely controllable circuit breaker of claim 11, wherein said first polarity signal is a momentary positive DC voltage and said second polarity signal is a momentary negative DC voltage.

14. The remotely controllable circuit breaker of claim 1, wherein said coil has a first input and a second input;

wherein said means structured for cooperation with a remote control circuit includes:

a first terminal, a second terminal, and a third terminal electrically connected to the second input of said coil;

a switch having a common terminal electrically connected to the first input of said coil, a first switched terminal electrically connected to said first terminal and selectively electrically connectable to said common terminal, and a second switched terminal electrically connected to said second terminal and alternatively selectively electrically connectable to said common terminal; and wherein said remote control circuit selectively applies the first polarity signal between said first and third terminals or, alternatively, the second polarity signal between said second and third terminals.

15. The remotely controllable circuit breaker of claim 14, wherein said first polarity signal is a positive DC voltage and said second polarity signal is a negative DC voltage.

16. The remotely controllable circuit breaker of claim 15, wherein said switch has an operating member coupled to said plunger, first contacts electrically connected between said common terminal and said first switched terminal and second contacts electrically connected between said common terminal and said second switched terminal, said first contacts and second contacts being operated by said operating member with said first contacts being closed when said plunger is in said first position and said second contacts being closed when said plunger is in said second position.

17. The remotely controllable circuit breaker of claim 16, wherein said switch is a microswitch and one of said first and second contacts is a pair of normally closed contacts and the other is a pair of normally open contacts.

18. The remotely controllable circuit breaker of claim 1, wherein said coil has a first input and a second input;

wherein said means structured for cooperation with a remote control circuit includes:

a first terminal, a second terminal, a third terminal electrically connected to the second input of said coil, a first diode electrically connected between said first terminal and the first input of said coil, and a second diode having an opposite polarity with respect to said first diode electrically connected between said second terminal and the first input of said coil; and wherein said remote control circuit selectively applies the first polarity signal or an AC signal between said first and third terminals or, alternatively, the second polarity signal or an AC signal between said second and third terminals.

19. The remotely controllable circuit breaker of claim 18, wherein said AC signal is a momentary AC voltage.

20. The remotely controllable circuit breaker of claim 18, wherein said first and second polarity signals are momentary positive and negative DC voltages, respectively.

21. The remotely controllable circuit breaker of claim 1, wherein said coil has a first input and a second input;

wherein said means structured for cooperation with a remote control circuit includes:

a first terminal, a second terminal, a third terminal electrically connected to the second input of said coil, a first diode having a cathode and having an anode connected to the first terminal, and a second diode having an anode and having a cathode connected to the second terminal; and a switch having a common terminal electrically connected to the first input of said coil, a first switched terminal electrically connected to the anode of said second diode and selectively electrically connectable to said common terminal, and a second switched terminal electrically connected to the cathode of said first diode and alternatively selectively electrically connectable to said common terminal; and wherein said remote control circuit selectively applies a positive signal or an AC signal between said first and third terminals or, alternatively, applies a negative signal or an AC signal between said second and third terminals, in order that said first diode applies the first polarity signal to said second switched terminal or, alternatively, the second diode applies the second polarity signal to first switched terminal.

22. The remotely controllable circuit breaker of claim 21, wherein said AC signal is a momentary AC voltage.

23. The remotely controllable circuit breaker of claim 21, wherein said positive and negative signals are momentary positive and negative DC voltages, respectively.

24. The remotely controllable circuit breaker of claim 1, wherein said latching solenoid further includes a core and a magnet, which holds the plunger against the core in the first position of said plunger and in the absence of the second polarity signal.

25. The remotely controllable circuit breaker of claim 1, wherein said plunger and said set of secondary contacts is operatively associated with a spring, which holds said set of secondary contacts in the second position thereof in the absence of the first polarity signal.

26. A remotely controllable circuit breaker comprising:

a set of contacts;

a latching solenoid including a plunger latchable to a first position which opens said set of contacts and to a second position which closes said set of contacts, a coil which when energized with a first polarity signal operates said plunger to said first position and which when energized with an opposite second polarity signal operates said plunger to said second position;

means for providing a trip signal in response to a trip condition of said set of contacts;

means cooperating with said means for providing a trip signal for energizing said coil with a first polarity signal in order to open said set of contacts; and means structured for cooperation with a remote control circuit for alternatively energizing said coil with the second polarity signal in order to close said set of contacts.

27. The remotely controllable circuit breaker of claim 26, wherein said means for providing a trip signal includes an overcurrent or fault trip circuit.

28. The remotely controllable circuit breaker of claim 27, wherein said means for providing a trip signal further includes at least one of an arc fault and a ground fault trip circuit.

29. The remotely controllable circuit breaker of claim 26, wherein said coil has a first input and a second input; wherein said means structured for cooperation with a remote control circuit includes a first terminal, and a second terminal electrically connected to the second input of said coil; wherein said means cooperating with said means for providing a first polarity signal includes a switch having a common terminal electrically connected to the first input of said coil, a first switched terminal electrically connected to said first terminal and alternatively selectively electrically connectable to said common terminal, and a second switched terminal electrically interconnected with said means for providing a trip signal and selectively electrically connectable to said common terminal, said means cooperating with said means for providing a trip signal providing the first polarity signal to the second switched terminal in order to open said set of contacts; and wherein said means structured for cooperation with a remote control circuit is structured to provide said second polarity signal between said first terminal and said second terminal in order to close said set of contacts.

* * * * *